(12) United States Patent
Evertz et al.

(10) Patent No.: US 6,699,947 B1
(45) Date of Patent: Mar. 2, 2004

(54) METHOD FOR PRODUCING PHILLIPS CATALYSTS FOR POLYMERIZING OLEFINS WITH BETTER PRODUCTIVITY RATES IN THE PARTICLE-FORM PROCESS

(75) Inventors: Kaspar Evertz, Schifferstadt (DE); Guido Funk, Worms (DE); Paulus de Lange, Wesseling (DE); Peter Kölle, Bad Dürkheim (DE); Andreas Deckers, Flomborn (DE)

(73) Assignee: Basell Polyolefine GmbH, Wessling (DE)

( * ) Notice: Subject to any disclaimer, the term of this patent is extended or adjusted under 35 U.S.C. 154(b) by 0 days.

(21) Appl. No.: 10/070,805

(22) PCT Filed: Aug. 31, 2000

(86) PCT No.: PCT/EP00/08508

§ 371 (c)(1),
(2), (4) Date: Mar. 11, 2002

(87) PCT Pub. No.: WO01/17676

PCT Pub. Date: Mar. 15, 2001

(30) Foreign Application Priority Data

Sep. 9, 1999 (DE) .......................................... 199 43 206

(51) Int. Cl.$^7$ ............................. C08F 4/24; C08F 10/02; B01J 21/08; B01J 23/26
(52) U.S. Cl. ....................... 526/106; 526/352; 526/348; 502/256; 502/319
(58) Field of Search .................................. 526/106, 352, 526/348; 502/256, 319

(56) References Cited

U.S. PATENT DOCUMENTS

| | | |
|---|---|---|
| 2,994,667 A | 8/1961 | Pitzer |
| 5,164,353 A | 11/1992 | Weber |
| 5,189,123 A | 2/1993 | Gropper |
| 5,352,658 A | 10/1994 | Evertz |
| 5,641,842 A | 6/1997 | McDaniel |

FOREIGN PATENT DOCUMENTS

WO 93/08146 4/1993

Primary Examiner—Caixia Lu
(74) Attorney, Agent, or Firm—Keil & Weinkauf

(57) ABSTRACT

In a process for producing Phillips catalysts in which an oxidic support material is treated in suspension with a chromium salt solution and subsequently, after removing the solvent, calcined in an oxygen-containing atmosphere at above 300° C., the oxidic support material and/or the catalyst after calcination are/is, according to the present invention, comminuted until a mean particle size of <100 μm has been reached and the proportion of particles having a size of <50 μm is at least 30%, preferably in the range from 40 to 80%. A process for preparing homopolymers or copolymers of ethene in a loop reactor at from 30 to 150° C. under a pressure in the range from 0.2 to 15 MPa in the presence of a catalyst produced by the process of the present invention is also provided.

9 Claims, No Drawings

METHOD FOR PRODUCING PHILLIPS CATALYSTS FOR POLYMERIZING OLEFINS WITH BETTER PRODUCTIVITY RATES IN THE PARTICLE-FORM PROCESS

The present invention relates to a process for producing Phillips catalysts in which an oxidic support material is treated in suspension with a chromium salt solution and subsequently, after removing the solvent, calcined in an oxygen-containing atmosphere at above 300° C.

A process of this type is known and is comprehensively described in, for example, DE-A 25 40 279. The catalysts produced as described there are also comminuted and have particle sizes in the range from 20 to 2,000 $\mu$m, in particular from 40 to 300 $\mu$m.

DE-A 36 40 802 and DE-A 36 40 803 state that restricting the oxidic support to a particular, very narrow particle size distribution in the range from 50 to 150 $\mu$m gives chromium trioxide catalysts which give polymers having an improved particle morphology at equal or higher catalyst productivity.

Finally, it has been found in U.S. Pat. No. 5,641,842 that Phillips catalysts having particle sizes of >75 $\mu$m are advantageous for the morphology of polyethylene prepared therewith.

After evaluation of the relevant literature, it can be said in summary that classification of the oxidic support material influences the catalyst productivity and the polyethylene morphology. According to the literature, the best results are generally achieved using relatively coarse catalysts, i.e. those having particle sizes of >50 $\mu$m.

It is an object of the present invention to provide a new process which makes it possible to produce Phillips catalysts which further increase the productivity of the polymerization of ethylene in loop precipitation processes and, in particular, allow increased polyethylene solids contents within the polymerization reactor.

We have found that this object is achieved by a process of the generic type mentioned at the outset, whose defining features are that the oxidic support material before calcination and/or the catalyst after calcination are/is comminuted until a mean particle size of <100 $\mu$m has been reached and the proportion of particles having a size of <50 $\mu$m is at least 30%.

According to the present invention, the oxidic support material used is a silica gel which has a solids content, calculated as silicon dioxide, in the range from 10 to 30% by weight, preferably from 11 to 25% by weight, and is largely spherical. Such a silica gel is obtained by introducing a solution comprising sodium water glass or potassium water glass into a twisting stream of a mineral acid longitudinally and tangentially to the flow direction of the stream and spraying the silicic acid hydrosol formed into a gaseous medium so as to form droplets. The sprayed hydrosol then solidifies in the gaseous medium to form spherical particles and is freed of adhering salts by washing with water.

The spherical hydrosol is then treated with an organic liquid selected from among alcohols having from 1 to 4 carbon atoms until at least 60% of the water present in the hydrosol has been extracted. The dewatered hydrogel which has been treated with the alcoholic liquid is then dried until at >160° C. using an inert carrier gas the residual alcohol content is less than 10% by weight.

The xerogel obtained in this way is then loaded with chromium from a 0.05–5% strength by weight solution of chromium trioxide in a ketone having from 3 to 5 carbon atoms or from a 0.05–15% strength by weight solution of a chromium compound which is converted into chromium trioxide under the conditions of the calcination in an alcohol having from 1 to 4 carbon atoms and the solvent is subsequently evaporated under reduced pressure.

For the calcination, the chromium-laden oxidic support material is maintained at from 300 to 1,100° C. in a water-free, oxygen-containing gas stream for from 10 to 1,000 minutes.

The comminution according to the present invention of the oxidic support material or of the catalyst material obtained as described above is carried out by dry milling using a ball mill or in a beater mill as described, for example, in DE-A 36 40 802. The milling time necessary to achieve the desired particle size is determined by taking samples at particular time intervals.

In the olefin polymerization in which the catalyst produced according to the present invention is used, it is possible to prepare homopolymers of ethylene or copolymers of ethylene with a comonomer having from 3 to 12 carbon atoms in an amount of up to 10% by weight of comonomer. The polymerization itself is carried out at from 30 to 150° C. under a pressure in the range from 0.2 to 15 MPa.

It has surprisingly been found that, at a constant reactor output, the Phillips catalysts having a particle size of <100 $\mu$m used according to the present invention result in an increase in the average residence time of the catalyst in the reactor and that the catalyst productivity increases at the same time. The higher catalyst productivity presumably results from significantly higher polyethylene solids concentrations being able to be achieved in the loop precipitation process, particularly in loop reactors, when using the catalysts produced according to the present invention than when using the catalysts described in the literature, which customarily have particle sizes of >100 $\mu$m. Furthermore, it has surprisingly been found that the Phillips catalysts produced according to the present invention make it possible to achieve comparable results in terms of the morphology of the polyethylene prepared therewith to those obtained using the conventional catalysts having particle sizes of >100 $\mu$m.

The process of the present invention gives particularly optimal results when the proportion of particles having a size of <50 $\mu$m is in the range from 40 to 80%.

For the purposes of the present invention, all particle size data were determined in accordance with DIN 53 477, sieve analysis.

The examples and comparative examples described below show that in the case of the catalysts described in the literature formation of deposits on the reactor wall occurs even at relatively low PE solids contents above 40% by weight, while the catalysts produced according to the present invention allow solids contents of about 60% without reactor fouling in loop reactors.

Production of the oxidic support material:

EXAMPLE 1 (according to the present invention)

The catalyst support was produced as described in DE-A 36 40 802, except that the dried xerogel spheres were milled by means of a beater mill to a mean particle size in the range from 1 to 100 $\mu$m and were sieved so that the proportion of particles having a size of <50 $\mu$m was 80%.

EXAMPLE 2 (according to the present invention)

The catalyst support was produced as described in Example 1, except that the proportion of particles having a size of <50 $\mu$m was only 30%.

EXAMPLE 3 (comparative example)

The catalyst support was produced as described in Example 1, except that the proportion of particles having a size of <50 μm was only 15%.

EXAMPLE 4 (comparative example)

The catalyst was produced as described in Example 1 of DE-A 36 40 802 (page 7, line 15). The support particles had a mean particle size in the range from 50 to 100 μm (page 8, line 26).

EXAMPLE 5 (comparative example)

The catalyst was produced as described in Comparative Experiment 1 in DE-A 36 40 802 (page 9, line 16). The support particles had a mean particle size in the range from 1 to 300 μm.

Production of catalysts 1–4:

Catalyst 1

Catalyst 1 was produced as described in Example 1 of DE-A 36 40 802 (page 8, line 31), except that 15 kg of the oxidic support material from Example 1 were used.

Catalyst 2

Catalyst 2 was produced as described in Example 1 of DE-A 36 40 802 (page 8, line 31), except that 15 kg of the oxidic support material from Example 2 were used.

Comparative catalyst 3

Comparative catalyst 3 was produced as described in Example 1 of DE-A 36 40 802 (page 8, line 31), except that 15 kg of the oxidic support material from Example 3 were used.

Comparative catalyst 4

Comparative catalyst 4 was produced as described in Example 1 of DE-A 36 40 802 (page 8, line 31) using 15 kg of the oxidic support material from Example 4, as described in DE-A 36 40 802.

Comparative catalyst 5

Comparative catalyst 5 was produced as described in Example 1 of DE-A 36 40 802 (page 8, line 31) using 15 kg of the oxidic support material from Example 5, as described in DE-A 36 40 802.

Polymerization:

For the polymerization of ethylene, use was made of a customary and known loop reactor whose reaction space consisted of a tube circuit having a capacity of 6 m³. At a pressure of 4.0 MPa, the reaction space contained a suspension comprising liquid i-butane, solid polyethylene, 6% by weight of dissolved ethene and 0.4% by weight of dissolved 1-hexene. The polymerization temperature was from 103.5 to 103.8° C.

The suspension was pumped around the reactor by means of a propeller pump operating at 3,000 rpm. At a constant reactor output of 900 kg of PE/h, attempts were made to increase the polyethylene solids content in the suspension as far as possible. The achievable PE solids contents were limited by occurrence of reactor fouling (formation of deposits on the reactor walls or increases in the power drawn by the propeller pump).

The following table shows the results achieved using the catalysts 1 to 5:

|  | Cat. 1 | Cat. 2 | Cat. 3 | Cat. 4 | Cat. 5 |
| --- | --- | --- | --- | --- | --- |
| Max. PE solids content in the reactor (% by weight) | 58 | 56 | 40 | 38 | 39 |
| Catalyst productivity (kg of PE/kg of cat.) | 12,450 | 11,750 | 6950 | 7200 | 6650 |
| Melt index HLMI 190° C./21.6 kp in accordance with DIN 53735 (g/10 min) | 6.2 | 6.4 | 6.5 | 6.2 | 6.4 |
| Bulk density in accordance with DIN 53468 (g/l) | 500 | 500 | 490 | 500 | 480 |
| Sieve analysis in accordance with DIN 53457 |  |  |  |  |  |
| <125 μm (%) | 0.5 | 0.6 | 0.4 | 0.4 | 0.6 |
| >2000 μm (%) | 0.2 | 0.3 | 0.2 | 0 | 0.5 |

Significantly higher PE solids contents in the loop reactor can be achieved when using the catalysts produced according to the invention, as a result of which the catalyst productivities increase significantly. In the cases of comparative catalysts 3 to 5, attempts to increase the PE solids contents to more than 40% by weight failed due to reactor fouling.

The bulk density of the polyethylene and the proportion of fumes and of coarse material <125 μm, >2000 μm) are virtually unchanged in the examples according to the present invention and are at the same level as those in the comparative examples.

We claim:

1. A process for producing Phillips catalysts in which an oxidic support material is treated in suspension with a chromium salt solution or a solution of chromium trioxide and subsequently, after removing the solvent, calcined in an oxygen-containing atmosphere at above 300° C., wherein the oxidic support material before calcination and/or the catalyst after calcination are/is comminuted until a mean particle size of <100 μm has been reached and the proportion of particles having a size <50 μm is at least 30% but not more than 80%.

2. A process as claimed in claim 1, wherein the oxidic support material used is a silica gel which has a solids content, calculated as silicon dioxide, in the range from 10 to 30% by weight, and is largely spherical.

3. A process as claimed in claim 2, wherein the spherical silica gel is prepared from spherical hydrosol which is treated with an organic liquid selected from among alcohols having from 1 to 4 carbon atoms until at least 60% of the water present in the hydrosol has been extracted, and the resulting dewatered hydrogel is then dried at >160° C. using an inert carrier gas until the residual alcohol content is less than 10% by weight to form the spherical silica gel.

4. A process as claimed in claim 3, wherein the dried silica gel is loaded with chromium from a 0.05–5% strength by weight solution of chromium trioxide in a ketone having from 3 to 5 carbon atoms or from a 0.05–15% strength by weight solution of a chromium salt compound which is converted into chromium trioxide under the conditions of the calcination in an alcohol having from 1 to 4 carbon atoms and the solvent is subsequently evaporated under reduced pressure.

5. A process as claimed in claim 1, wherein the calcination of the chromium-laden oxidic support material is carried out in a water-free gas stream containing at least 10% by volume of oxygen for from 10 to 1,000 min at from 300 to 1,100° C.

6. A process as claimed in claim 1, wherein the comminution of the oxidic support material and/or of the catalyst material obtained after calcination is carried out by dry milling using a ball mill or in a beater mill.

7. A process as claimed in claim 1, wherein comminution is continued until the proportion of particles having a size of <50 μm is in the range from 40 to 80%.

8. A process for olefin polymerization in which homopolymers of ethylene or copolymers of ethylene and a comonomer having from 3 to 12 carbon atoms in an amount of up to 10% by weight of comonomer are prepared, wherein the polymerization is carried out in the presence of a Phillips catalyst produced by a process as claimed in claim 1 at from 30 to 150° C. under a pressure in the range from 0.2 to 15 MPa.

9. A process as claimed in claim 8, wherein the polymerization is carried out as a precipitation polymerization in a loop reactor.

* * * * *